(12) United States Patent
Cangemi et al.

(10) Patent No.: US 10,459,134 B2
(45) Date of Patent: Oct. 29, 2019

(54) UV-BLOCKING COATING WITH CAPPING LAYER IN OPTICAL ASSEMBLY HAVING UV LIGHT SOURCE

(71) Applicant: Corning Incorporated, Corning, NY (US)

(72) Inventors: Michael Jerome Cangemi, Canandaigua, NY (US); Jean-Francois Oudard, Webster, NY (US)

(73) Assignee: Corning Incorporated, Corning, NY (US)

( * ) Notice: Subject to any disclaimer, the term of this patent is extended or adjusted under 35 U.S.C. 154(b) by 101 days.

(21) Appl. No.: 15/229,863

(22) Filed: Aug. 5, 2016

(65) Prior Publication Data

US 2017/0052294 A1 Feb. 23, 2017

Related U.S. Application Data

(60) Provisional application No. 62/206,531, filed on Aug. 18, 2015.

(51) Int. Cl.
| | | |
|---|---|---|
| *B29D 11/00* | (2006.01) | |
| *C09J 5/02* | (2006.01) | |
| *G02B 1/11* | (2015.01) | |
| *G02B 5/20* | (2006.01) | |

(Continued)

(52) U.S. Cl.
CPC ........ *G02B 5/208* (2013.01); *B29D 11/00009* (2013.01); *C09J 5/02* (2013.01);
(Continued)

(58) Field of Classification Search
CPC ........ B29D 11/00009; B32B 17/10449; B32B 17/10678; B32B 37/26; B32B 2307/42;
(Continued)

(56) References Cited

U.S. PATENT DOCUMENTS

| | | |
|---|---|---|
| 5,991,072 A | 11/1999 | Solyntjes et al. |
| 6,097,536 A | 8/2000 | Bauer |

(Continued)

FOREIGN PATENT DOCUMENTS

JP 04139471 8/2008

OTHER PUBLICATIONS

International Search Report and Written Opinion PCT/US2016/047472 dated Oct. 25, 2016.

*Primary Examiner* — Jennifer D. Carruth
*Assistant Examiner* — Ryan S Dunning
(74) *Attorney, Agent, or Firm* — Kevin L. Bray

(57) ABSTRACT

An optical assembly and a method for making the optical assembly. The optical assembly includes an optical element; a blocking coating; a capping layer on the blocking coating; a holder; and an adhesive configured to adhere the optical element to the holder. The blocking coating includes a light absorber that does not transmit light with wavelengths from greater than or equal to about 250 nm to less than or equal to about 400 nm; The light absorber is positioned such that light having a wavelength from greater than or equal to about 190 nm to less than or equal to about 500 nm is not incident to the adhesive. The capping layer is made from a material having high transmission in the UV and enables use of aggressive cleaning treatments on the optical element significant impairment of the UV transmission of the optical element.

25 Claims, 11 Drawing Sheets

(51) Int. Cl.
*G02B 7/02* (2006.01)
*G02B 1/14* (2015.01)
*G02B 5/22* (2006.01)
*G02B 13/14* (2006.01)

(52) U.S. Cl.
CPC .................. *G02B 1/11* (2013.01); *G02B 1/14* (2015.01); *G02B 5/22* (2013.01); *G02B 7/025* (2013.01); *C09J 2400/10* (2013.01); *G02B 13/143* (2013.01)

(58) Field of Classification Search
CPC ........... C09J 5/02; C09J 2400/10; F21V 9/06; G02B 1/10; G02B 1/105; G02B 1/11; G02B 1/14; G02B 5/003; G02B 5/208; G02B 5/22; G02B 2006/12126; G02B 7/006; G02B 7/025; G02B 13/14; G02B 13/143; G02F 2201/08; G02F 2201/086; G02F 2203/055
USPC ....... 156/60, 308.6; 359/350, 355, 359, 360, 359/361, 614, 811, 819, 885, 892; 362/293
See application file for complete search history.

(56) References Cited

U.S. PATENT DOCUMENTS

| | | | |
|---|---|---|---|
| 6,210,028 B1* | 4/2001 | Murakoshi | F21S 48/1258 313/112 |
| 7,081,278 B2 | 7/2006 | Lipson | |
| 2006/0033984 A1 | 2/2006 | Bruynooghe | |
| 2009/0233233 A1* | 9/2009 | Six | G03F 7/70341 430/289.1 |
| 2010/0271605 A1 | 10/2010 | Lipson et al. | |
| 2011/0205643 A1 | 8/2011 | Schreiber et al. | |
| 2013/0196255 A1* | 8/2013 | Hayashi | G03F 1/24 430/5 |
| 2013/0303127 A1 | 11/2013 | Zellner et al. | |
| 2014/0036353 A1* | 2/2014 | Krogdahl | B29C 65/1435 359/350 |
| 2014/0356591 A1* | 12/2014 | Motohashi | B32B 7/12 428/200 |
| 2015/0070906 A1 | 3/2015 | Cangemi | |
| 2015/0355380 A1* | 12/2015 | Apitz | G02B 1/14 359/601 |

* cited by examiner

UV-BLOCKING COATING WITH CAPPING LAYER IN OPTICAL ASSEMBLY HAVING UV LIGHT SOURCE

This application claims the benefit of priority under 35 U.S.C. § 119 of U.S. Provisional Application Ser. No. 62/206,531 filed on Aug. 18, 2015 the content of which is relied upon and incorporated herein by reference in its entirety.

TECHNICAL FIELD

The present specification generally relates to coatings for optical elements, and methods for applying coatings to optical elements. More particularly, the present specification relates to coatings on optical elements that protect adhesives used to mount the optical element in an optical system from degradation caused by UV light. Most particularly, the present specification relates to UV-protective coatings with capping layers designed to minimize impairment of the UV transmission of the optical element from contamination produced during aggressive cleaning processes.

BACKGROUND

Optical systems are used in a variety of end-user applications that process or analyze samples with UV light, including in lithography and semiconductor inspection equipment. In these systems, one or more optical elements with high transmission of UV light are aligned to direct and collect UV light introduced to the optical system to perform an operation on the sample. Optical elements include lenses, prisms, beam splitters etc. The optical elements are typically mounted in holders and fixed in position with an adhesive. Reliable and precise operation of the optical system requires that the positions of the optical elements remain fixed over time to insure consistency of alignment. Many common adhesives, however, are sensitive to UV light and subject to degradation when exposed to stray UV light present in the optical system. Degradation of the adhesive may cause an optical element to slip in its holder and lead to misalignment of the optical system. There is accordingly a need to prevent degradation of adhesives used to mount optical components in optical systems that utilize UV source light.

SUMMARY

According to one embodiment, an optical assembly is described that includes an optical element; a holder for the optical element; an adhesive configured to affix the optical element to the holder; a blocking coating between the optical element and the adhesive; and a capping layer between the optical element and the holder. The optical assembly may also include an adhesion promoter between the blocking coating and the optical element.

The blocking coating includes a light absorber that does not transmit light with wavelengths from greater than or equal to about 250 nm to less than or equal to about 400 nm. The light absorber may be positioned such that light having a wavelength from greater than or equal to about 190 nm to less than or equal to about 500 nm is not incident to the adhesive.

In another embodiment, an optical assembly is described that includes an optical element; a blocking coating on the optical element, where the blocking coating includes a light absorber does not transmit light with wavelengths from greater than or equal to about 190 nm to less than or equal to about 500 nm; and a capping layer on the blocking coating. The optical assembly may also include an adhesion promoter between the blocking coating and the optical element.

In yet another embodiment, a method for reducing degradation of an adhesive in an optical assembly is described, including applying a blocking coating to an optical element, where the blocking coating includes a light absorber that does not transmit light with wavelengths from greater than or equal to about 190 nm to less than or equal to about 500 nm; configuring the light absorber relative to an adhesive used to position the optical element to a holder so that light with wavelengths from greater than or equal to about 190 nm to less than or equal to about 500 nm is not incident to an adhesive used to position the optical element; and applying a capping layer to the blocking coating. The method may also applying an adhesion promoter to the optical element before applying the light absorber to the optical element.

Optical elements include transmissive or refractive elements such as lenses, prisms, and beam splitters.

The capping layer is on a surface of the blocking coating opposite the optical element. The capping layer includes a material with high UV transmission. Suitable materials for the capping layer include oxides, nitrides, and carbides of metals and non-metals. The capping layer is selected to exhibit a wide bandgaps to insure high UV transmission. The capping layer also has low absorption and reflection of UV wavelengths. Exemplary capping layers include $SiO_2$, $Al_2O_3$, $Si_3N_4$, $TiO_2$, $ZrO_2$, $Ta_2O_5$, $SnO_2$, MgO, $La_2O_3$, and $Y_2O_3$.

The blocking coating includes a light absorber and may also include an anti-reflection layer and/or an anti-scratch layer. The blocking coating may include a plurality of light absorbers or a plurality of light absorbers with a plurality of anti-reflection and/or protection layers.

The light absorber may be a metal, metal oxide, metal nitride, metal carbide, or combinations thereof. The anti-reflection layer may be a metal oxide, metal nitride, metal carbide, or combinations thereof. The anti-scratch layer may be a metal oxide, metal nitride, metal carbide, or combinations thereof. The metal present in the light absorber may be the same or different from the metal present in the anti-reflection layer. In embodiments with two or more light absorbers, the metal present in one light absorber may be the same of different from the metal present in other light absorbers. In embodiments with two or more anti-reflection layers, the metal present in one anti-reflection layer may be the same or different from the metal present in other anti-reflection layers.

The adhesion promoter may be fluoride or oxide material. In one embodiment, the adhesion promoter includes a fluoride material and the optical element includes a fluoride material. The fluoride material may be an alkaline earth fluoride. In another embodiment, the optical element includes $CaF_2$ and the adhesion promoter includes $MgF_2$.

The present description extends to:
An optical assembly comprising:
  an optical element;
  a holder for the optical element;
  a blocking coating positioned between the optical element and the holder, the blocking coating including a light absorber that does not transmit light with wavelengths from greater than or equal to about 190 nm to less than or equal to about 500 nm;
  a capping layer positioned between the light absorber and the holder; and an adhesive configured to adhere the optical element to the holder; wherein the light absorber is positioned such that light having a wavelength from greater than or equal to about 190 nm to less than or equal to about 500 nm is not incident to the adhesive.

The present description extends to:

An optical assembly comprising:

an optical element;

a blocking coating in contact with the optical element, the blocking coating including a light absorber that does not transmit light with wavelengths from greater than or equal to about 190 nm to less than or equal to about 500 nm; and a capping layer, the light absorber being positioned between the capping layer and the optical element.

The present description extends to:

A method for reducing degradation of an adhesive in a optical assembly, the method comprising:

applying a blocking coating to an optical element, the blocking coating including a light absorber that does not transmit light with wavelengths from greater than or equal to about 190 nm to less than or equal to about 500 nm;

applying a capping layer to the blocking coating, the capping layer comprising SiO2 or a metal oxide material;

applying an adhesive to the capping layer; and configuring the light absorber and the adhesive so that light with wavelengths from greater than or equal to about 190 nm to less than or equal to about 500 nm is not incident to the adhesive.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch one of one or more intervening materials that establish indirect contact of the elements. Elements in contact may be rigidly or non-rigidly joined. Materials or layers adjacent to each other are in contact. Materials or layers that are directly adjacent to each other are in direct contact.

Reference will now be made in detail to embodiments of optical assemblies having optical elements and holders for optical elements as well as to methods for adhering optical elements to optical assemblies. Embodiments of optical assemblies may comprise an optical element and a holder for the optical element. The optical element may be secured to the holder by an adhesive. The adhesive may be arranged in a number of configurations at positions where the optical element is configured to contact the holder. In embodiments, the optical assembly including the optical element and the holder may be incorporated into an optical system that includes a light source to provide light to the optical element. The light source may have a wavelength that is capable of degrading the adhesive if the adhesive is exposed to light from the light source. Stray light, for example, is often present in optical systems. The potential for degradation of many adhesives is particularly problematic when light from the light source includes UV wavelengths. To prevent degradation of the adhesive, the optical assembly comprises a light absorber that is positioned to prevent exposure of the adhesive to light.

In the description that follows, the discussion will refer to lenses as embodiments of optical elements. It is understood, however, that optical elements include transmissive or refractive optical components generally. Representative optical elements include lenses, prisms and beam splitters.

Figure 1:
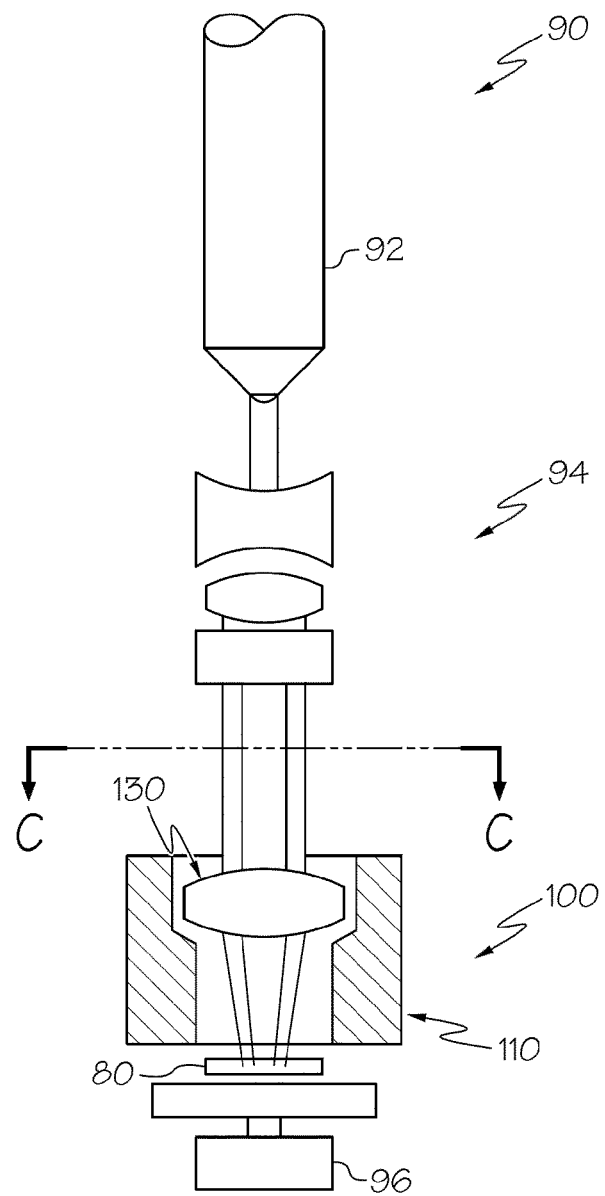
FIG. 1 schematically depicts a cut-away front view of an optical system having a lens coupled to a lens holder according to one or more embodiments shown or described herein.

Referring to FIG. 1, a portion of an optical system 90 is schematically depicted with certain components cut-away for clarity. In the depicted embodiment, the optical system 90 includes a light source 92, at least one beam shaping element 94, an optical assembly 100, and a part carrier 96. The optical assembly 100 includes a lens holder 110 and a lens 130. Light provided by the light source 92 is directed through the lens 130 of the optical assembly 100, which transmits and refracts the light towards a workpiece 80 that is supported on the part carrier 96. The optical system 90 may be used to perform a manufacturing operation on the workpiece 80, for example, inspecting the workpiece 80 or modifying the workpiece 80, such as in a lithography process.

Figure 2:
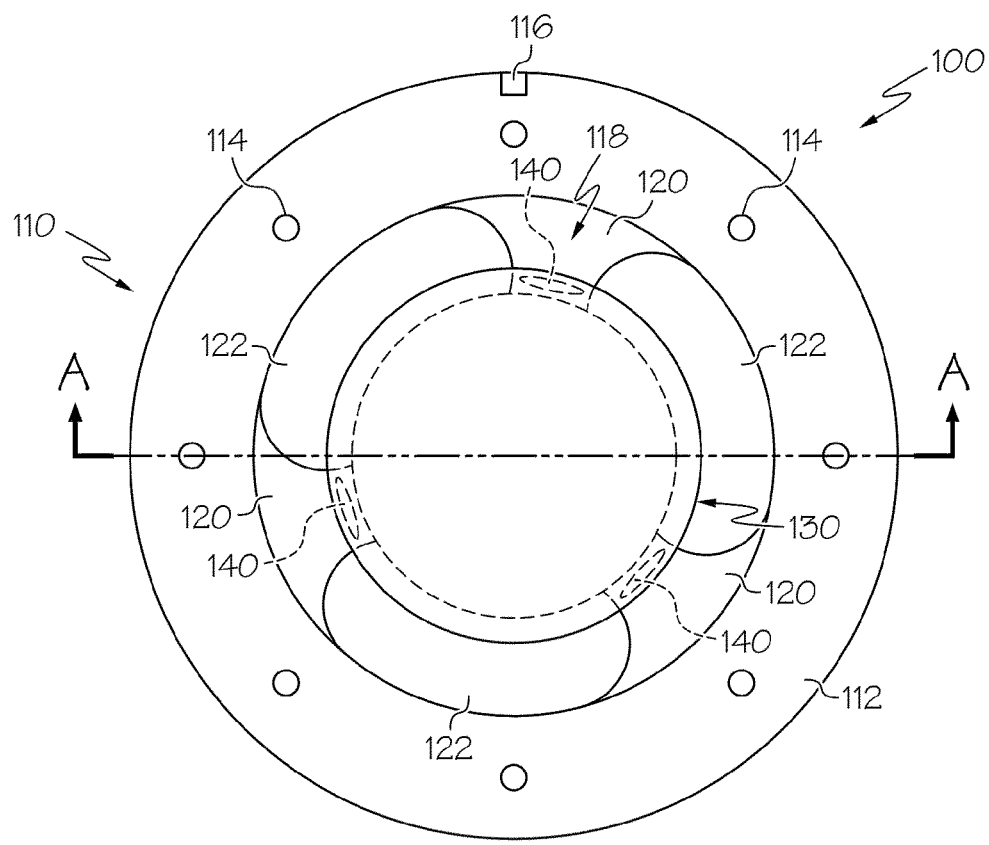
FIG. 2 schematically depicts a top view of an optical assembly having a lens coupled to a lens holder according to one or more embodiments shown or described herein.

Referring now to FIG. 2, one embodiment of the optical assembly 100 is depicted. In this embodiment, the optical assembly 100 includes a lens holder 110 and a lens 130. The lens holder 110, shown in cross-section in FIG. 3, includes a fastening portion 112 and a lens support portion 118. The fastening portion 112 includes a plurality of mounting elements 114 that provide securement locations to fasten the lens holder 110 in the optical system and/or to other lens holders within the optical system. In the embodiment shown in FIG. 2, through holes pass through the fastening portion 112. The fastening portion 112 may also include a clocking element 116, for example, a key and/or keyway. The clocking element 116 may provide an orientation reference between adjacent components of the optical system 90 so that alignment of the components of the optical system 90 can be maintained.

In the depicted embodiment, the lens support portion 118 extends in a radially inward orientation from the fastening portion 112. The lens support portion 118 may include a planar portion 124 and a contoured portion 126, as depicted in detail in FIG. 4. In this embodiment, the contoured portion 126 is located at radially inward positions from the planar portion 124. The contoured portion 126 may be shaped to conform to the general shape of the lens 130 at positions at which the lens 130 is coupled to the lens support portion 118 by the adhesive 140.

Figure 4:
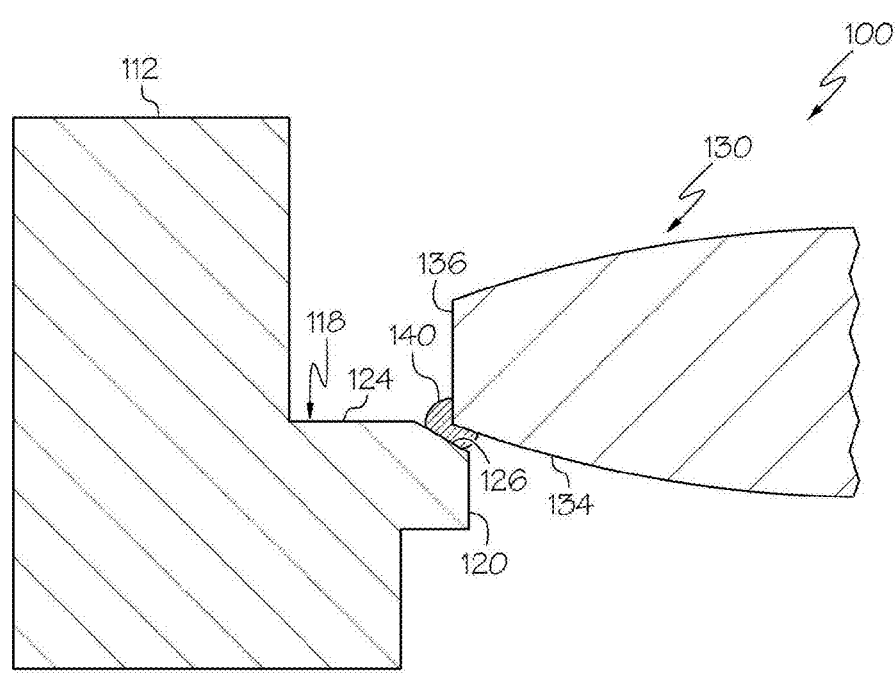
FIG. 4 schematically depicts a detailed sectional front view of an optical assembly having a lens coupled to a lens holder shown at view J of FIG. 3 according to one or more embodiments shown or described herein.

Referring to FIG. 4, an attachment portion 134 of the lens 130 is coupled to the lens support portion 118 with an adhesive 140. In some embodiments, the adhesive 140 is positioned at a plurality of positions arranged in a circumferential orientation around the lens 130. Regions of the adhesive 140 may be separated from one another at intermediate circumferential positions between the regions of the adhesive 140, so that the optical assembly 100 is generally free of adhesive 140 at circumferential positions between the regions of the adhesive 140.

Suitable materials for the adhesive 140 include materials that are commercially available, including cements and adhesives, examples of which are discussed in U.S. Pat. Nos. 7,232,595 and 7,256,221, which are hereby incorporated by reference in their entirety. When assembling the optical assembly 100, the adhesive 140 may be positioned in the desired locations along the lens support portion 118 of the lens holder 110. The lens 130 may be inserted and held in position relative to datum features of the lens holder 110, including the clocking element 116. The lens 130 may be held in position until the adhesive 140 has an opportunity to dry or cure, thereby maintaining the position of the lens 130 relative to the datum features of the lens holder 110. These adhesive materials typically satisfy operational requirements of elastic modulus and coefficient of thermal expansion, and are well suited for use in optical systems 90 described herein.

However, the materials used as the adhesive 140 may be prone to degradation when illuminated by light sources with particular wavelengths. The degradation may be particularly acute when the light source emits light at short wavelengths, for example at wavelengths corresponding to deep ultra-violet and extreme ultra-violet wavelengths. At short wavelengths, energy from the light source has a tendency to break down the materials of the adhesive 140. The degradation may cause outgassing of the adhesive 140, which may lead to contamination of the optical system 90. Degradation of the adhesive 140 may also negatively affect the tensile strength and/or the elasticity of the adhesive 140, which may reduce the ability of the adhesive 140 to maintain the position of the lens 130 relative to the datum features of the lens holder 110. Misalignment between the lens 130 and the datum features of the lens holder 110 may reduce the performance characteristics of the optical system 90.

Figure 3:
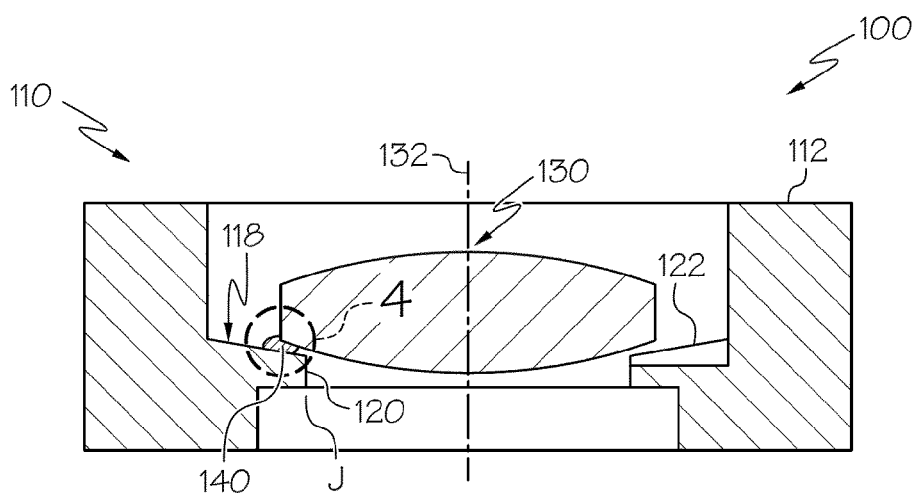
FIG. 3 schematically depicts a sectional front view of an optical assembly having a lens coupled to a lens holder shown along line A-A of FIG. 2 according to one or more embodiments shown or described herein.

In the embodiment depicted in FIGS. 2 and 3, the lens support portion 118 includes a plurality of support pads 120 that are arranged at circumferential orientations around the lens support portion 118. The plurality of support pads 120 are each separated from one another by relief channels 122 that are spaced apart from the support pads 120 in a direction corresponding to an optical axis 132 of the lens 130. The support pads 120 and the relief channels 122 provide an interrupted mounting plane along the lens support portion 118 to which the lens 130 is coupled. In this embodiment, adhesive 140 is positioned along the support pads 120 to contact the lens 130. The adhesive 140 is generally not positioned at positions proximate to the relief channels 122, such that the lens 130 is separated from the lens holder 110 at positions proximate to the relief channels 122. The spacing between the lens 130 and the relief channels 122 of the lens holder 110 provides a gap through which fluid may travel. In certain embodiments of the optical system 90, purge gas may be introduced to the optical assembly 100 and flow through the gap created between the relief channels 122 and the lens 130 to flush any contaminants.

While the embodiment of FIGS. 2 and 3 depicts a lens holder 110 that incorporates three support pads 120, and therefore three relief channels 122 and three regions of adhesive 140, it should be understood that the lens holder 110 may include any number of support pads 120, relief channels 122, and regions of adhesive 140 as dictated by the design and requirements of the optical system 90.

Figure 5:
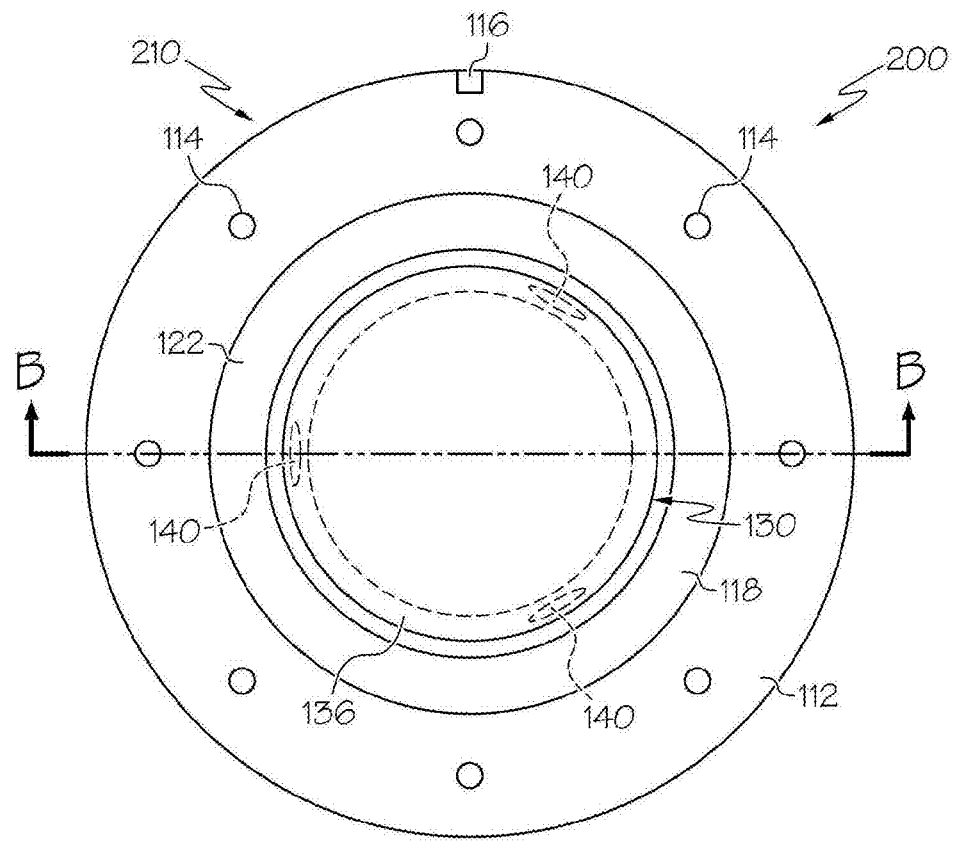
FIG. 5 schematically depicts a top view of an optical assembly having a lens coupled to a lens holder according to one or more embodiments shown or described herein.
Figure 6:
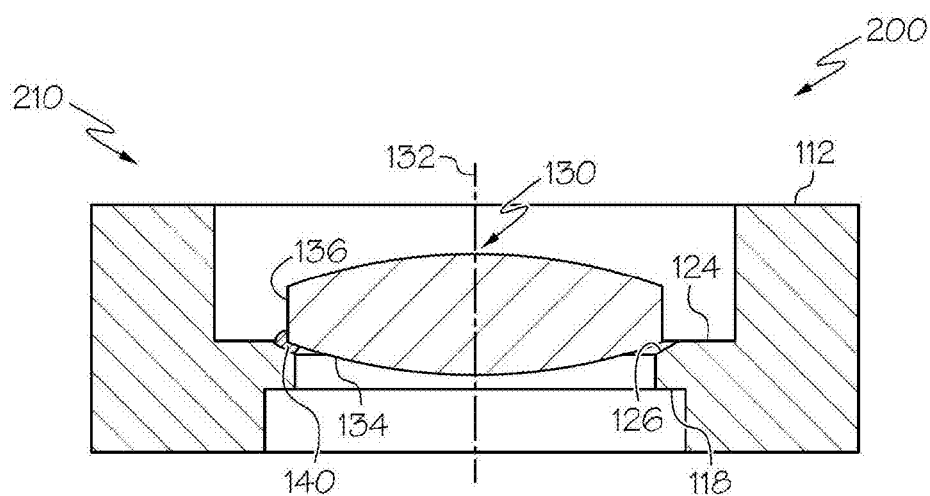
FIG. 6 schematically depicts a sectional front view of an optical assembly having a lens coupled to a lens holder shown along line B-B of FIG. 5 according to one or more embodiments shown or described herein.

Referring now to FIGS. 5 and 6, another embodiment of the optical assembly 200 incorporating a lens holder 210 and the lens 130 is depicted. In this embodiment, the lens holder 210 includes a fastening portion 112 and a lens support portion 118. The fastening portion 112 includes a plurality of mounting elements 114, here through holes that pass through the fastening portion 112, that provide securement locations to couple the lens holder 210 in the optical system. The fastening portion 112 may also include a clocking element 116, for example, a key and/or keyway. The clocking element 116 may provide an orientation reference between adjacent components of the optical system 90 so that radial alignment of the components of the optical system 90 can be maintained.

In this embodiment, the lens support portion 118 may be continuous in shape around its circumference 136, such that the lens support portion 118 is uninterrupted in the circumferential orientation. The lens 130 is coupled to the lens support portion 118 with adhesive 140 positioned in discrete regions that are arranged at positions proximate to the circumference 136 of the lens 130. The adhesive 140 may generally be positioned within the discrete regions only, so that the adhesive 140 is not located at positions between adjacent regions.

Because the adhesive 140 is positioned in discrete regions between the lens support portion 118 of the lens holder 110 and the lens 130, and because the adhesive 140 may have a thickness, the lens 130 may be positioned above the lens support portion 118 by the adhesive 140. In these embodiments, at positions between the discrete regions of adhesive 140, the spacing between the lens support portion 118 and the lens 130 may provide a gap through which fluid may travel. In certain embodiments of the optical system 90, purge gas may be introduced to the optical assembly 200 and flow through the gap created between the lens support portion 118 and the lens 130 at positions spaced apart from the discrete regions of adhesive 140 to flush any contaminants.

Although embodiments discussed above with reference to FIGS. 2-6 recite that the adhesive may be located in discrete regions, in other embodiments the adhesive may be applied to the lens in any configuration suitable to adhere the lens to the lens holder. For example, in some embodiments, the adhesive may be applied continuously around the circumference of the lens.

To protect the adhesive from degradation or damage caused by UV light in the optical system, the present specification provides a blocking coating on the lens. The blocking coating is positioned between the lens and the adhesive and is configured to block UV light from the adhesive. As noted hereinabove, the lens may be affixed to a holder with an adhesive. The adhesive is positioned in one or more positions of the holder that align with one or more outer radial or circumferential positions of the lens. The blocking coating is applied to the lens at positions that generally coincide with the position of the adhesive when the optical element is mounted in the holder. The inner radial or central portions of the lens are the working portions of the lens that are used to transmit light in accordance with the design of the optical system and are free of the blocking coating to insure that the blocking coating does not impair transmission of the lens. The blocking coating may be in direct or indirect contact with the adhesive. The blocking coating may be in direct or indirect contact with the lens. Illustrative embodiments are described below.

Figure 7:
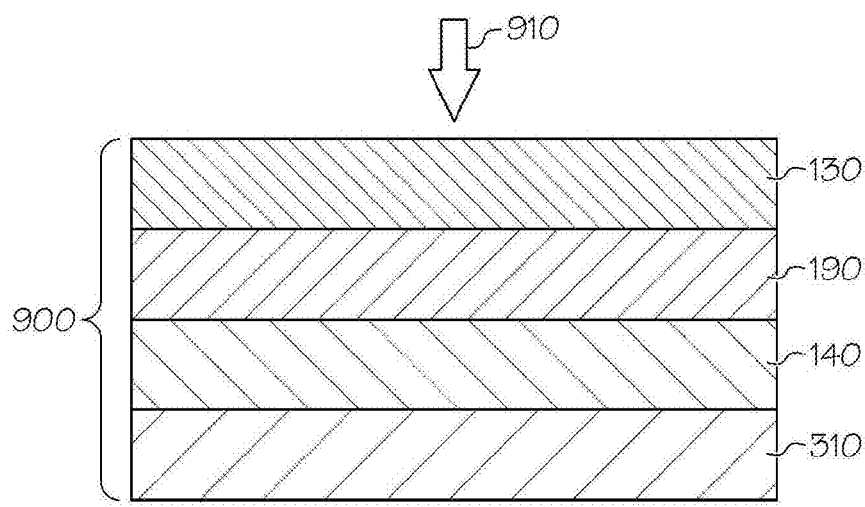
FIG. 7 schematically depicts a layered structure for adhering a lens to a lens holder according to one or more embodiments shown or described herein.

Referring now to the embodiment depicted in FIG. 7, the optical assembly may include a layered structure 900 comprising blocking coating that includes a light absorber 190 positioned between the lens 130 and the adhesive 140. The light absorber 190 is configured to absorb and/or reflect wavelengths of light emitted from the light source 910 that may degrade the adhesive 140. In embodiments, the light absorber 190 may be positioned between the light source 900 and the adhesive 140, as shown, for example, in FIG. 7 to prevent light within the absorbed and/or reflected wavelengths from being incident to the adhesive 140. Although FIG. 7 shows a horizontal orientation of the layered structure 900, it should be understood that other orientations of the layered structure, such as a vertical orientation, are within the scope of this disclosure for the embodiment shown in FIG. 7 as well as all embodiments of layered structures disclosed herein.

The light absorber 190 may comprise any material that absorbs a broad spectrum of UV light. In embodiments, the light absorber 190 comprises a material that absorbs both the actinic wavelength and the dominant curing wavelength used to cure the adhesive 140. In some embodiments, the light absorber 190 absorbs light with wavelengths of from greater than or equal to about 190 nm to less than or equal to about 500 nm, such as from greater than or equal to about 220 nm to less than or equal to about 480 nm. In other embodiments, the light absorber 190 absorbs light with wavelengths of from greater than or equal to about 230 nm to less than or equal to about 460 nm, such as from greater than or equal to about 240 nm to less than or equal to about 440 nm. In yet other embodiments, the light absorber 190 absorbs light with wavelengths of from greater than or equal to about 250 nm to less than or equal to about 400 nm, such as from greater than or equal to about 260 nm to less than or equal to about 375 nm. In still other embodiments, the light absorber 190 may absorb light with wavelengths of from greater than or equal to about 265 nm to less than or equal to about 365 nm. The thickness and composition of the light absorber 190 may be selected to absorb and/or reflect at least 90%, or at least 95%, or at least 99% of radiation with wavelengths in any of the ranges indicated above.

The material comprising the light absorber 190 is capable of absorbing and/or reflecting at least a portion of UV light, as described above. In some embodiments, the material comprising the light absorber 190 may be one or more metals that are capable of absorbing and/or reflecting UV light. In other embodiments, the material comprising the light absorber 190 may be one or more transition metals. In yet other embodiments, the material comprising the light absorber 190 may be selected from chromium, titanium, zinc, nickel, manganese, iron, niobium, silver, gold, hafnium, aluminum, tantalum, and mixtures thereof. In embodiments, the metals may be present as substantially pure metals, or as metal oxides, metal nitrides, metal carbides, or mixtures thereof. The variety of materials that may be used as the light absorber allow for different configurations of the layered structure that were not previously available. For example, in some embodiments, the light absorber material may be selected so that the light absorber may be applied to a surface of the lens 130 that does not face the light source. However, in other embodiments, the light absorber material may be selected so that the light absorber may be applied to a surface of the lens 130 that faces the light source.

Although FIG. 7 shows the layers of the layered structure 900 having the same approximate thicknesses, in embodiments, each layer of the layered structure 900 may have any suitable thickness. The light absorber 190 may have a thickness such that the transmission of light at the actinic wavelength is less than or equal to about 5%, or even less than or equal to about 4%. In some embodiments, the thickness of the light absorber is such that the transmission of light at the actinic wavelength is less than or equal to about 3%, or even less than or equal to about 2%. In addition, the light absorber does not transmit light at a wavelength that will cure the adhesive. Therefore, in embodiments, the thickness of the light absorber does not need to be adjusted to transmit light at the curing wavelength. Accordingly, configurations of the optical assembly that were previously undesirable because the thickness of the light absorber would not have been tuned to transmit light at a curing wavelength may be employed in some embodiments. The thickness of the light absorber may be in the range from 25 nm-500 nm, or in the range from 50 nm-400 nm, or in the range from 100 nm-300 nm.

In some embodiments, the layered structure 900 may be configured to provide other properties to the optical assembly. In embodiments, the layered structure 900 may be configured to reduce the refection of light from the light absorber 190, the adhesive 140, and/or the lens holder 310 from scattering into various components of the optical apparatus, which may cause the optical apparatus to operate poorly. The anti-reflective properties may be provided by selecting a light absorber 190 that reflects little or no light. However, in some embodiments, the anti-reflective properties may be provided by adding a layer to the layered structure 900. In some embodiments, layers may be added to the layered structure 900 to promote adhesion of one layer to another and/or to protect a layer of the layered structure 900.

Figure 8:
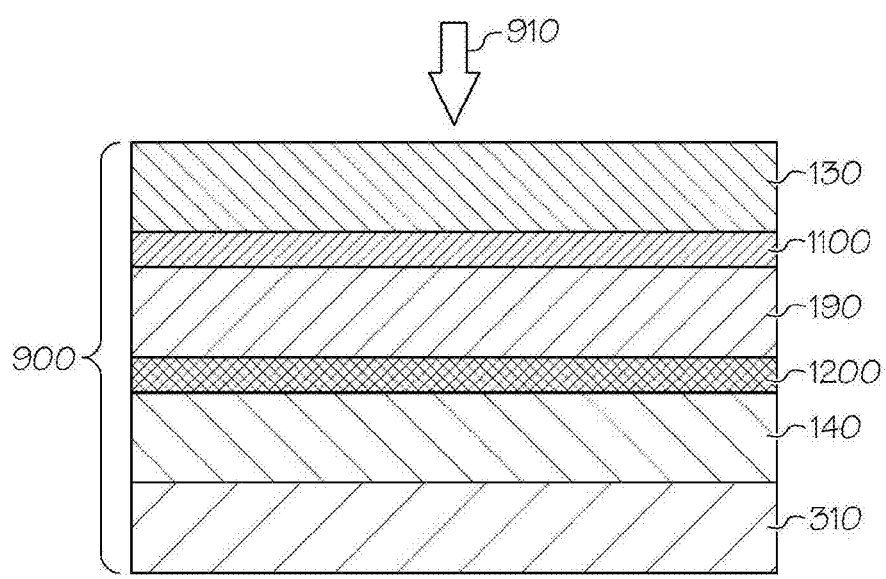
FIG. 8 schematically depicts a layered structure for adhering a lens to a lens holder including an anti-reflective layer and an anti-scratch layer according to one or more embodiments shown or described herein.

Referring now to embodiments depicted in FIG. 8, the layered structure 900 may comprise layers in addition to the lens 130, the light absorber 190, the adhesive 140, and the lens holder 310. In some embodiments, the layered structure 900 may comprise a blocking coating with the light absorber 190 and one or more of an anti-reflective layer 1100 and an anti-scratch layer 1200. An anti-reflective layer 1100 may be positioned between the lens 130 and the light absorber 190. The anti-reflective layer 1100 may comprise a material that acts as an internal anti-reflective layer. The material comprising the anti-reflective layer 1100 may be any material that provides anti-reflective properties to the layered structure 900. In some embodiments, the anti-reflective layer 1100 may be comprised of metal oxides, metal carbides, metal nitrides, or mixtures thereof. In some embodiments, the anti-reflective layer 1100 may include an oxide of chromium, titanium, zinc, nickel, manganese, iron, niobium, silver, gold, halfnium, aluminum, tantalum, and mixtures thereof. In some embodiments, the anti-reflective layer 1100 may include an oxide of the metal that comprises the light absorber 190. For example, if the light absorber 190 is comprised of chromium, the anti-reflective layer 1100 may be comprised of chromium oxide, such as chromium (III) oxide. However, in other embodiments, the anti-reflective layer 1100 may be comprised of a metal oxide with a metal that is different from the metal of the light absorber 190. In some embodiments, the layered structure with the anti-reflective layer 1100 may have a reflectance at any wavelength in the wavelength range from 190 nm to 500 nm of less than or equal to about 20%, such as less than or equal to about 18%, or even less than or equal to about 16%. The thickness of the anti-reflective layer may be in the range from 10 nm-100 nm, or in the range from 20 nm-80 nm, or in the range from 30 nm-60 nm.

The blocking coating of layered structure 900 may also include an anti-scratch layer 1200. In embodiments, the anti-scratch layer may be applied between the light absorber 190 and the adhesive 140. The anti-scratch layer 1200 prevents the light absorber 190 from being damaged during processing. For example, if the light absorber 190 is scratched, light from the light source 910 may be transmitted through the scratch in the light absorber 190 to the adhesive 140, which may cause the adhesive 140 to degrade and allow the lens 130 to become misaligned. By providing an anti-scratch layer 1200, it becomes less likely that the light absorber 190 will be damaged, such as by scratching. The anti-scratch layer 1200 may be comprised of any material that is capable of providing scratch resistance to the light absorber 190 and is also compatible with the light absorber 190 and the adhesive 140. In some embodiments, the anti-scratch layer 1200 may be comprised of a metal oxide, metal nitride, metal carbide, or mixtures thereof. In some embodiments, the anti-scratch layer 1200 may be comprised of an oxide of chromium, titanium, zinc, nickel, manganese, iron, niobium, silver, gold, hafnium, aluminum, tantalum, and mixtures thereof. In some embodiments, the anti-scratch layer 1200 may be comprised of an oxide of the metal that comprises the light absorber 190. For example, if the light absorber 190 is comprised of chromium, the anti-scratch layer 1200 may be comprised of chromium oxide, such as chromium (III) oxide. However, in other embodiments, the anti-scratch layer 1200 may be comprised of a metal oxide with a metal that is different from the metal of the light absorber 190. The thickness of the anti-scratch layer may be in the range from 50 nm-400 nm, or in the range from 75 nm 300 nm, or in the range from 100 nm-200 nm.

Figure 9:
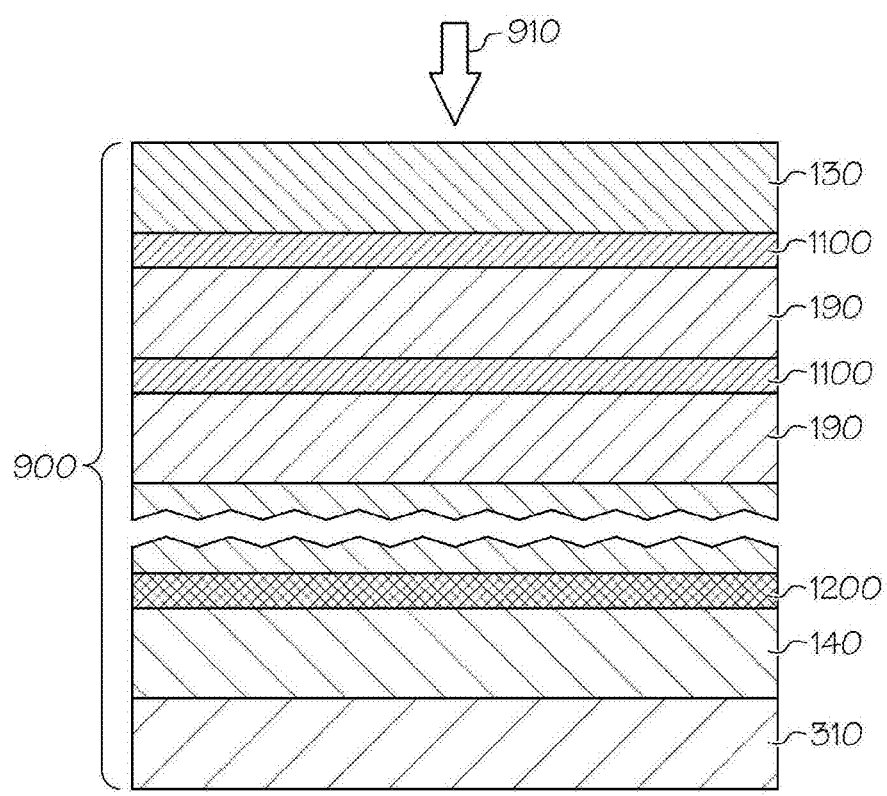
FIG. 9 schematically depicts a layered structure for adhering a lens to a lens holder including multiple anti-reflective layers and multiple absorbers according to one or more embodiments shown or described herein.

Referring now to FIG. 9, the layered structure 900 may comprise a blocking coating with multiple light absorbers 190 and multiple anti-reflective layers 1100. The number of light absorbers 190 and anti-reflective layers 1100 is limited by the physical constraints of the optical apparatus. In embodiments, each light absorber 190 has an anti-reflective layer 1100 positioned on the side nearest the lens 130. In some embodiments, there may be two light absorbers 190 and two anti-reflective layers 1100, or even three light absorbers 190 and three anti-reflective layers 1100. In other embodiments, there may be four light absorbers 190 and four anti-reflective layers 1100, or even five light absorbers 190 and five anti-reflective layers 1100.

After depositing the blocking coating on the lens 130, it may be desirable to clean the uncoated portion of the lens 130 to improve surface quality and optical performance. Cleaning of lens 130 during routine maintenance of the optical system in which lens 130 is installed may also be desirable. Cleaning techniques range from simple treatments with solvents (e.g. methanol) to more aggressive treatments (e.g. etching, plasma cleaning). Although the more aggressive treatments often provide superior cleaning of the working surface of the lens 130, they also tend to degrade the blocking coating. Degradation of the blocking coating often leads to contamination of the working surface of the lens 130 with debris. Since the blocking coating is designed to absorb UV light, presence of debris from the blocking coating on the uncoated working surface of the lens 130 compromises performance. It is accordingly desirable to minimize the presence of contamination, especially contamination that absorbs UV light, on the working surface of the lens 130 that results from cleaning.

Embodiments of the present specification include optical assemblies with a capping layer in contact with the blocking coating. The capping layer is in contact with a surface of the blocking coating opposite the lens 130. When the lens 130 is installed in the holder 310, the capping layer contacts the adhesive 140. In one embodiment, the capping layer is in direct contact with the adhesive 140. When the lens 130 is not installed in the holder 310, the capping layer is exposed. The capping layer is preferably configured to cover the blocking coating such that the blocking coating is not exposed when the lens 130 is not installed in the holder 310. In this configuration, when the lens 130 is subject to a cleaning treatment, the capping layer is exposed to the cleaning treatment and the blocking coating is protected. As a result, any degradation or debris caused by the cleaning treatment occurs in the capping layer. Debris from the underlying blocking coating results only if the capping layer is stripped away or otherwise removed by the cleaning treatment. By providing a capping layer of adequate thickness relative to the aggressiveness of the cleaning treatment, degradation of the blocking coating can be substantially avoided. If the capping layer is made from a material that does not absorb, or only weakly absorbs, UV light, presence of debris from the capping layer on the working surface of the lens 130 does not significantly reduce the UV transmittance of the lens 130 and the optical performance of lens 130 is maintained.

To minimize UV absorption, the capping layer is preferably made from a wide bandgap material. Suitable materials include oxides, carbides, and nitrides of metals or nonmetals that exhibit low absorption and high transmittance at the UV wavelengths used in the optical system. Transmission of the capping layer (per mm thickness) at each wavelength in the range from 200 nm-400 nm may be at least 80%, or at least 85%, or at least 90%, or at least 95%, or at least 99%. Transmission of the capping layer (per mm thickness) at each wavelength in the range from 225 nm-380 nm may be at least 80%, or at least 85%, or at least 90%, or at least 95%, or at least 99%. Transmission of the capping layer (per mm thickness) at each wavelength in the range from 250 nm-360 nm may be at least 80%, or at least 85%, or at least 90%, or at least 95%, or at least 99%. Represenative materials for the capping layer include $SiO_2$, $Al_2O_3$, $Si_3N_4$, $TiO_2$, $ZrO_2$, $Ta_2O_5$, $SnO_2$, MgO, $La_2O_3$, and $Y_2O_3$.

Figure 10:
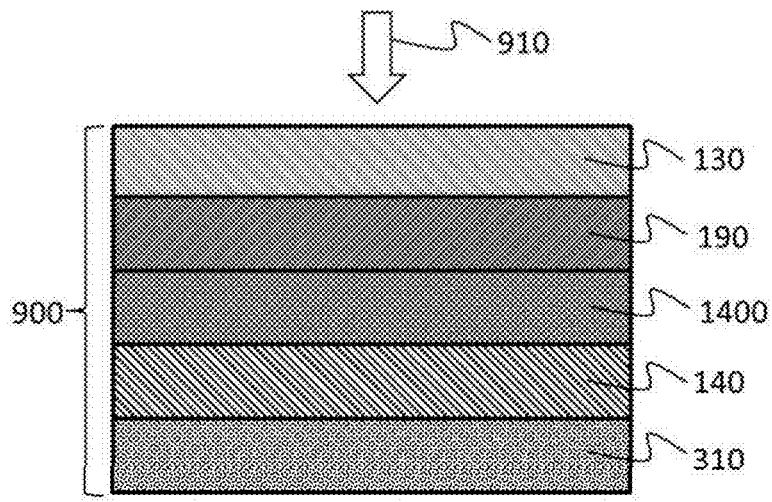
FIG. 10 schematically depicts a layered structure with a capping layer according to one or more embodiments shown or described herein.

Referring now to the embodiment depicted in FIG. 10, the optical assembly may include a layered structure 900 comprising a capping layer 1400 positioned between the lens 130 and adhesive 140, or between the light absorber 190 and adhesive 140. The capping layer 1400 may be in direct contact with the light absorber and/or in direct contact with the adhesive.

Figure 11:
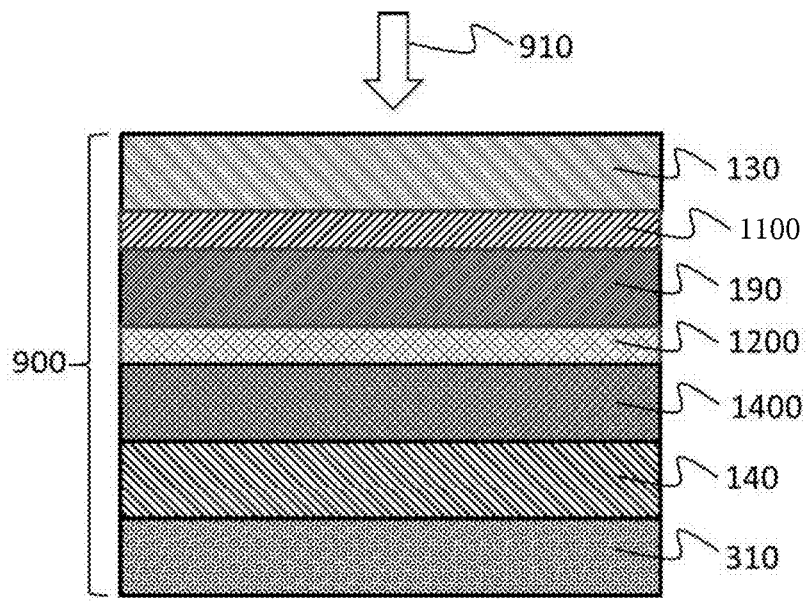
FIG. 11 schematically depicts a layered structure that includes a capping layer, an anti-reflective layer and an anti-scratch layer according to one or more embodiments shown or described herein.

Referring now to the embodiment depicted in FIG. 11, the layered structure 900 may include capping layer 1400 in addition to the lens 130, the light absorber 190, one or more of an anti-reflective layer 1100 and an anti-scratch layer 1200, the adhesive 140, and the lens holder 310. The capping layer 1400 may be positioned between the lens 130 and the adhesive 140, or between the anti-reflective layer 1100 and the adhesive 140, or between the light absorber 190 and the adhesive 140, or between the anti-scratch layer 1200 and the adhesive 140. The capping layer may be in direct contact with the anti-scratch layer 1200 and/or the adhesive 140.

Figure 12:
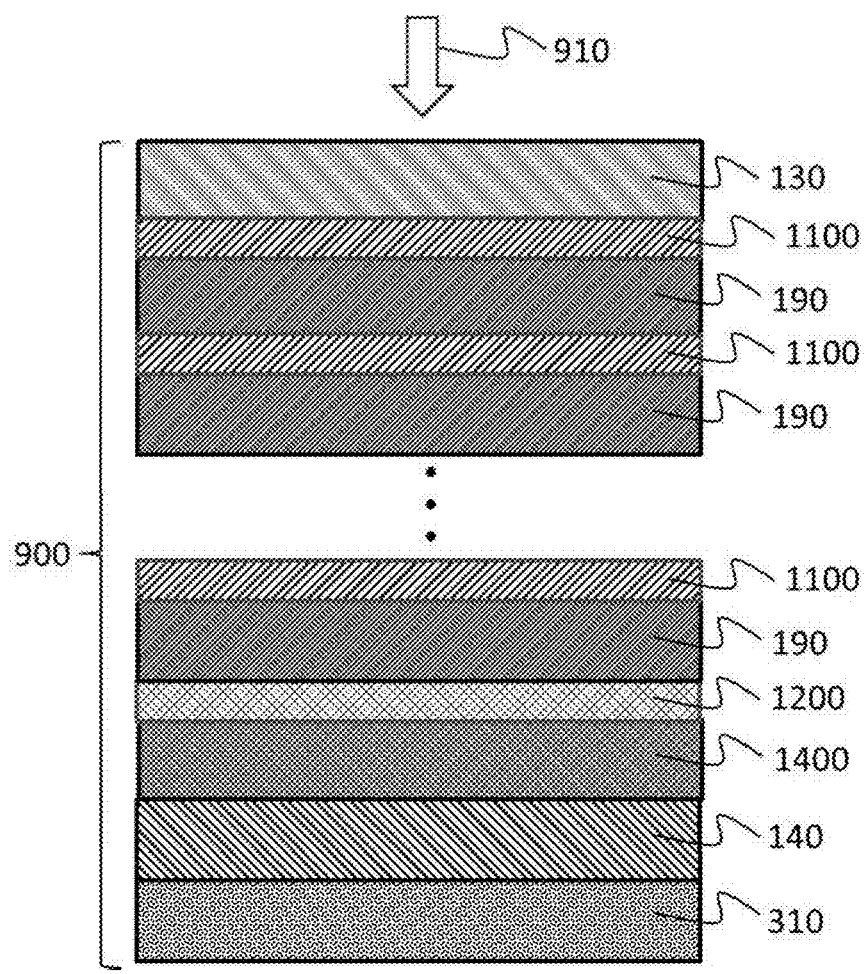
FIG. 12 schematically depicts a layered structure that includes a capping layer, multiple anti-reflective layers, and multiple absorbers according to one or more embodiments shown or described herein.

Referring now to FIG. 12, the layered structure 900 may include capping layer 1400 in addition to lens 130, multiple light absorbers 190 and multiple anti-reflective layers 1100, an optional anti-scratch layer 1200, the adhesive 140, and the lens holder 310. The capping layer 1400 may be positioned between the lens 130 and the adhesive 140, or between any of the anti-reflective layers 1100 and the adhesive 140, or between the light absorber 190 and the adhesive 140, or between any of the anti-scratch layers 1200 and the adhesive 140. The capping layer may be in direct contact with the anti-scratch layer 1200 furthest removed from the lens 130 and/or the adhesive 140.

Figure 13:
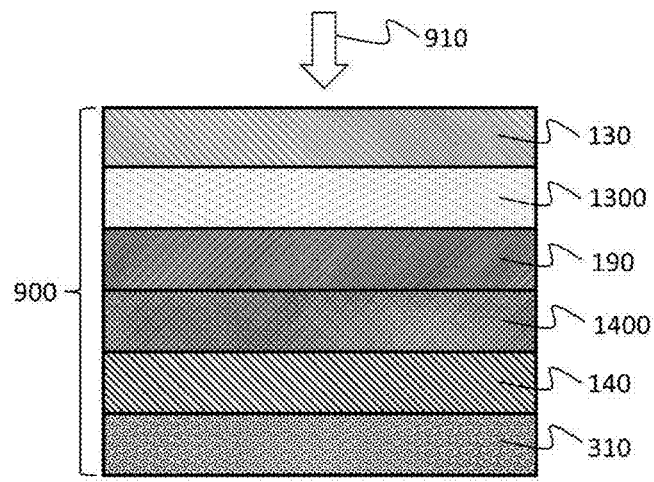
FIG. 13 schematically depicts a layered structure that includes a capping layer and an adhesion promoter according to one or more embodiments shown or described herein.

Referring now to the embodiment depicted in FIG. 13, the optical assembly may include a layered structure 900 comprising a capping layer 1400 and an adhesion promoter 1300 positioned between the lens 130 and the adhesive 140. The adhesion promoter 1300 improves adhesion of the light absorber 190 to the lens 130 and minimizes the likelihood of delamination of the blocking coating. The adhesion promoter 1300 is preferentially positioned directly adjacent to lens 130. The adhesion promoter 1300 may be positioned between the lens 130 and adhesive 140, or between the lens 130 and capping layer 1400, or between the light absorber 190 and the lens 130. The capping layer 1400 may be in direct contact with the light absorber and/or in direct contact with the adhesive.

Figure 14:
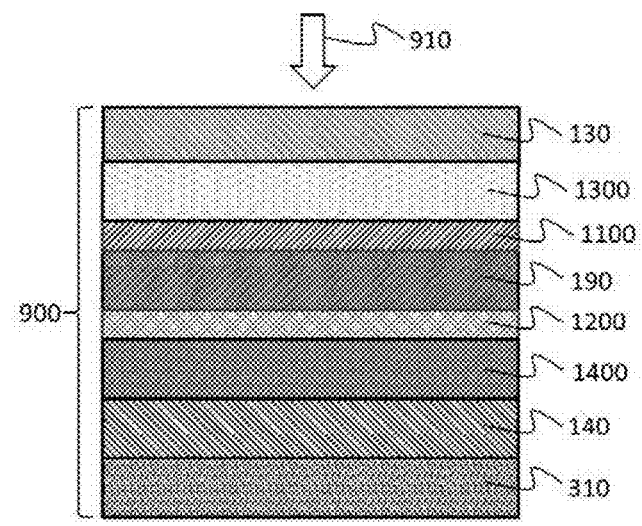
FIG. 14 schematically depicts a layered structure that includes a capping layer, an adhesion promoter, an anti-reflective layer and an anti-scratch layer according to one or more embodiments shown or described herein.

Referring now to the embodiment depicted in FIG. 14, the layered structure 900 may include a capping layer 1400, an adhesion promoter 1300, the lens 130, the light absorber 190, one or more of an anti-reflective layer 1100 and an anti-scratch layer 1200, the adhesive 140, and the lens holder 310. The adhesion promoter 1300 is preferentially directly adjacent to the lens 130 and improves adhesion of the anti-reflective layer 1100 to the lens 130. The adhesion promoter 1300 may be positioned between the lens 130 and adhesive 140, or between the lens 130 and capping layer 1400, or between the light absorber 190 and the lens 130, or between the anti-reflective layer 1100 and the lens 130, or between the anti-scratch layer 1200 and the lens 130. The capping layer 1400 may be positioned between the lens 130 and the adhesive 140, or between the anti-reflective layer 1100 and the adhesive 140, or between the light absorber 190 and the adhesive 140, or between the anti-scratch layer 1200 and the adhesive 140. The capping layer may be in direct contact with the anti-scratch layer 1200 and/or the adhesive 140.

Figure 15:
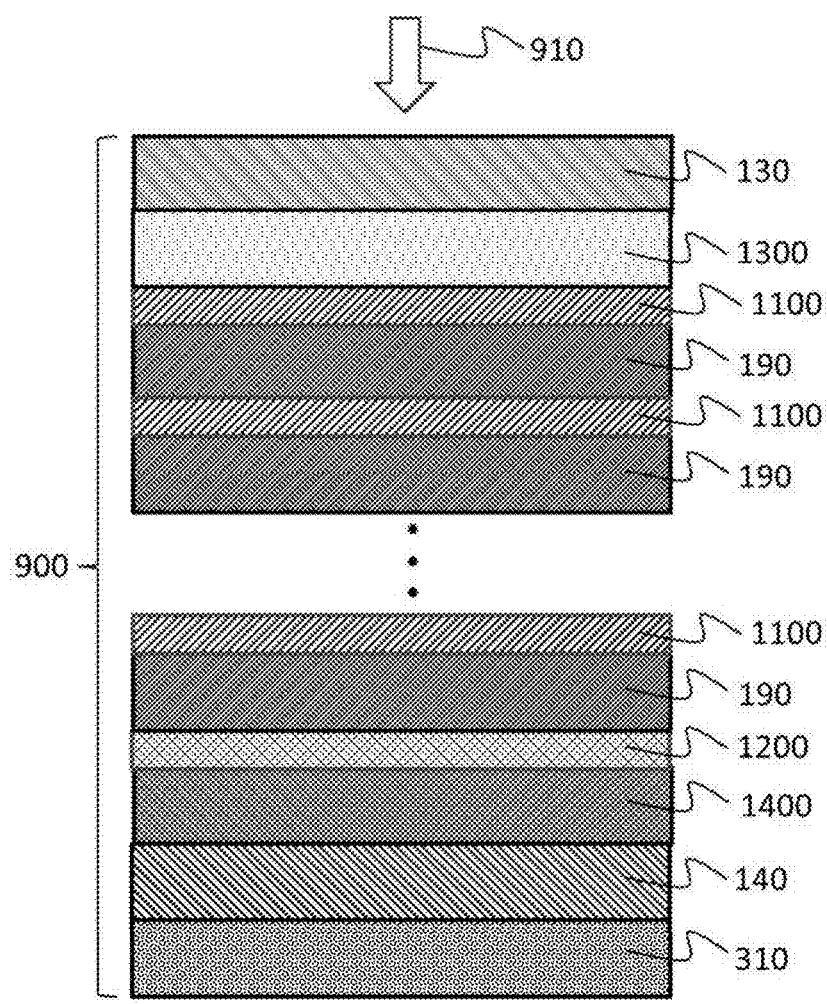
FIG. 15 schematically depicts a layered structure that includes a capping layer, an adhesion promoter, multiple anti-reflective layers and multiple absorbers according to one or more embodiments shown or described herein.
Figure 16:
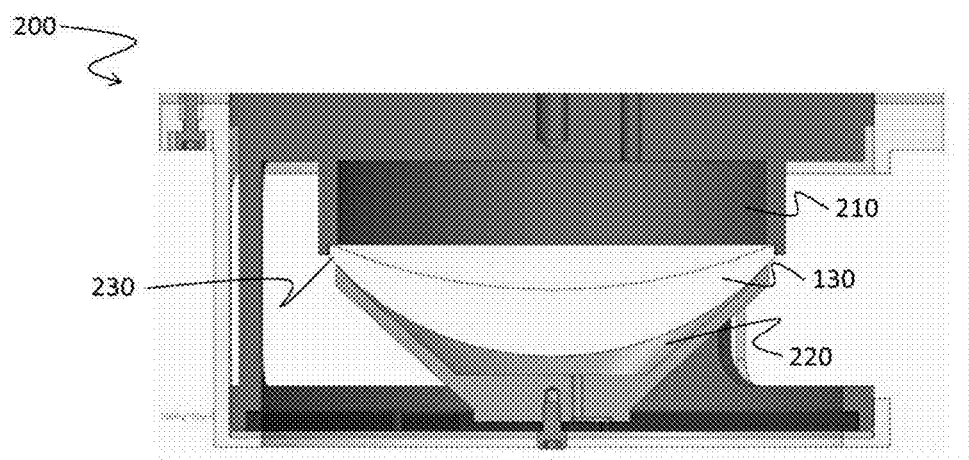
FIG. 16 shows a fixture for depositing materials on to the outer radial or circumferential portions of a lens.

Referring now to the embodiment depicted in FIG. 15, the layered structure 900 may include a capping layer 1400, an adhesion promoter 1300, the lens 130, multiple light absorbers 190, multiple anti-reflective layers 1100, an optional anti-scratch layer 1200, the adhesive 140, and the lens holder 310. The adhesion promoter 1300 is preferentially directly adjacent to the lens 130 and improves adhesion of the anti-reflective layer 1100 to the lens 130 in a multiple period layered stack. The adhesion promoter 1300 may be positioned between the lens 130 and adhesive 140, or between the lens 130 and capping layer 1400, or between the light absorber 190 and the lens 130, or between any of the anti-reflective layers 1100 and the lens 130, or between any of the anti-scratch layers 1200 and the lens 130. The capping layer 1400 may be positioned between the lens 130 and the adhesive 140, or between any of the anti-reflective layers 1100 and the adhesive 140, or between the light absorber 190 and the adhesive 140, or between any of the anti-scratch layers 1200 and the adhesive 140. The capping layer may be in direct contact with the anti-scratch layer 1200 furthest removed from the lens 130 and/or the adhesive 140.

The adhesion promoter 1300 may be any material that improves adhesion of the light absorber 190 or anti-reflective layer 1100 to the lens 130. In one embodiment, the adhesion promoter 1300 is a fluoride material. Fluoride materials include alkaline earth fluorides, transition metal fluorides, rare earth fluorides, or combinations thereof. Representative fluoride materials include $AlF_3$, $BaF_2$, $CaF_2$, $GdF_3$, $LaF_3$, $MgF_2$, $NdF_3$, $TbF_3$, $YbF_3$, and $YF_3$. In one embodiment, the lens 130 includes a fluoride material and the adhesion promoter 1300 is a fluoride material. In another embodiment, the lens 130 includes $CaF_2$ and the adhesion promoter 1300 includes $MgF_2$ or $Ca_xMg_{1-x}F_2$. In one embodiment, the adhesion promoter 1300 is directly adjacent the lens 130. In another embodiment, the adhesion promoter 1300 includes two or more materials or two or more layers. In still another embodiment, the adhesion promoter 1300 is anti-reflective and functions as an anti-reflective layer in a layered stack 900. The thickness of the adhesion promoter may be in the range from 1 nm-50 nm, or in the range from 3 nm-30 nm, or in the range from 5 nm-20 nm.

Although FIGS. 7-15 show all of the components of the layered structures situated on one side of the lens, in some embodiments, the adhesive may be positioned on an opposite side of the lens from the other components of the layered structure so long as the other components of the layered structure prevent UV light from being incident to the adhesive. For example, in embodiments, the absorber (and optionally the adhesion promoter, anti-reflective layer, anti-scratch layer, and/or capping layer) may be positioned on a side of the lens that is incident to a light source. The adhesive may be positioned on the opposite, non-incident side of the lens but the absorber may still prevent UV light from being incident to the adhesive if the adhesive is configured properly.

The layered structures may be applied to the lens by any suitable method. For example, in some embodiments, the layered structure may be applied by vacuum deposition, sputtering, spray coating, ink-jet printing, etc. In embodiments where the layered structures are applied by, for example, vacuum deposition or sputtering, a mask may be used to protect the optical surface of the lens during the application. The mask is configured to directly contact only the circumference of the lens and does not directly contact the optical surface of the lens so as to not scratch or otherwise damage the optical surface of the lens while providing protection from the deposition methods. The mask does not cover predetermined portions of the lens that are intended to be adhered to the lens holder. Once the mask is in place, the layered structure may be applied to the predetermined portions of the lens.

FIG. 13 shows a fixture for applying a blocking coating, an adhesion promoter, and/or a capping layer to a lens. Fixture 200 includes mask 210 to support lens 130 at its circumference and cover 220 to prevent deposition of the coating on the central portion of lens 130. Outer radial or circumferential region 230 is left exposed to provide a surface upon which the blocking coating, adhesion promoter, and/or capping layer is deposited. The region of deposition aligns or generally coincides with the position of the adhesive on or within the holder when the lens is mounted.

Also disclosed are methods for protecting an adhesive in an optical apparatus. In embodiments, the method comprises applying at least a blocking coating and an adhesion promoter as described herein to an optical element. The method may also include affixing the optical element to a holder with an adhesive. The blocking coating may be applied directly adjacent the adhesion promoter and the adhesion promoter may be applied directly adjacent the optical element. The blocking coating includes a light absorber configured so that when the optical element is installed in an optical apparatus, the light absorber is positioned to shield the adhesive so that UV light is not incident to the adhesive. The light absorber does not transmit UV light from a light source, which may degrade the adhesive. The light absorber may be applied directly adjacent the adhesion promoter. In embodiments, applying the blocking coating may further include applying an anti-reflective layer as described, where the anti-reflective layer is positioned between the optical element and the light absorber. The anti-reflective layer may be positioned directly adjacent the adhesion promoter. In some embodiments, applying the blocking coating may include applying an anti-scratch layer as described herein to a surface of the light absorber opposite the optical element to protect the optical element during handling, such as during installation into the optical apparatus.

Each layer of the layered structure may be applied by any suitable deposition method, such as vacuum deposition, spin-on coating, sol-gel deposition, inkjet deposition, chemical vapor deposition, physical vapor deposition, and electron beam evaporation. In some embodiments, each layer of the layered structure may be applied by the same deposition method. However, in other embodiments, one or more layers of the layered structure may be applied by a different deposition method than other layer(s). Some embodiments comprise contacting one of the light absorber or the anti-scratch layer with an adhesive that is configured to adhere the optical element to a holder.

EXAMPLES

Embodiments will be further clarified by the following examples.

Blocking coatings were applied to a series of optical elements. The optical elements were lenses made from $CaF_2$. Blocking coatings were applied to the outer radial portion of the lenses. Four samples were prepared. The blocking coating for each sample included a 40 nm thick layer of $Cr_2O_3$ (anti-reflective layer) directly adjacent the optical element, a 40 nm thick layer of Cr (light absorber) directly adjacent the anti-reflective layer and a 171 nm thick layer of $Cr_2O_3$ (anti-scratch layer) directly adjacent the light absorber. Sample 1 included the blocking layer without a capping layer. A capping layer made from $SiO_2$ was applied to Samples 2, 3, and 4. Each of the four samples was subjected to a plasma cleaning treatment. The plasma consisted of Ar and $O_2$, the plasma voltage was 50 V. Treatment with the plasma caused ablation and removal of material from the top layer of each sample. Results are summarized in Table 1 below.

TABLE 1

| Sample | Stack | Top Layer | Thickness (nm) (Pre-Treatment) | Thickness (nm) (Post-Treatment) | Loss (nm) |
|---|---|---|---|---|---|
| 1 | $CaF_2/Cr_2O_3/Cr/Cr_2O_3$ | $Cr_2O_3$ | 170.7 | 166.2 | 4.5 |
| 2 | $CaF_2/Cr_2O_3/Cr/Cr_2O_3/SiO_2$ | $SiO_2$ | 11.1 | 6.9 | 4.2 |

TABLE 1-continued

| Sample | Stack | Top Layer | Thickness (nm) (Pre-Treatment) | Thickness (nm) (Post-Treatment) | Loss (nm) |
|---|---|---|---|---|---|
| 3 | $CaF_2/Cr_2O_3/Cr/Cr_2O_3/SiO_2$ | $SiO_2$ | 11.6 | 8.4 | 3.2 |
| 4 | $CaF_2/Cr_2O_3/Cr/Cr_2O_3/SiO_2$ | $SiO_2$ | 15 | 13.2 | 1.8 |

The results indicate that the plasma cleaning treatment led to ablation and removal of material from the top layer of each sample. The ablated material constitutes debris that may redeposit on the uncoated working surface of the $CaF_2$ lens. Since high transmittance of the $CaF_2$ lens in the UV is important to optical throughput and since debris from the $Cr_2O_3$ top layer of the sample lacking a capping layer absorbs much more strongly in the UV than the $SiO_2$ capping layer of the remaining samples, the results indicate that inclusion of the $SiO_2$ capping layer enables use of plasma cleaning treatments on optical elements without significant impairment of the UV transmittance of the optical element.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An optical assembly comprising:
an optical element, the optical element including a circumferential portion surrounding a central portion;
a blocking coating in direct contact with the circumferential portion of the optical element, the central portion of the optical element being free of the blocking coating, the blocking coating including a light absorber that does not transmit light with wavelengths from greater than or equal to about 190 nm to less than or equal to about 500 nm;
a capping layer in contact with the blocking coating and differing in composition from the light absorber, the capping layer comprising a material selected from the group consisting of $SiO_2$, metal oxides, metal nitrides, and metal carbides, the light absorber being positioned between the capping layer and the optical element; and
an ultraviolet light source, wherein the optical element is positioned between the ultraviolet light source and the light absorber.

2. The optical assembly of claim 1, wherein the blocking coating further includes an anti-reflective layer positioned between the optical element and the light absorber.

3. The optical assembly of claim 2, wherein the anti-reflective layer comprises a material selected from the group consisting of metal oxides, metal nitrides, metal carbides, and mixtures thereof.

4. The optical assembly of claim 1, wherein the light absorber comprises one or more materials selected from the group consisting of chromium, titanium, zinc, nickel, manganese, iron, niobium, silver, gold, hafnium, aluminum, tantalum, oxides thereof, nitrides thereof, and carbides thereof.

5. The optical assembly of claim 1, wherein the capping layer is in direct contact with the blocking coating.

6. The optical assembly of claim 1, wherein the blocking coating directly contacts the entirety of the circumferential portion of the optical element.

7. The optical assembly of claim 1, wherein the central portion of the optical element has an optical axis and wherein the optical element transmits UV light incident to the optical element along the optical axis.

8. An optical assembly comprising:
an optical element, the optical element including a circumferential portion surrounding a central portion;
a holder for the optical element;
a blocking coating positioned between the optical element and the holder, the blocking coating directly contacting the circumferential portion of the optical element, the central portion of the optical element being free of the blocking coating, the blocking coating including a light absorber that does not transmit light with wavelengths from greater than or equal to about 190 nm to less than or equal to about 500 nm;
a capping layer differing in composition from the light absorber and positioned between the light absorber and the holder;
an adhesive in direct contact with the holder and configured to adhere the optical element to the holder, the adhesive having a curing wavelength, the blocking coating not transmitting the curing wavelength; and
an ultraviolet light source, wherein the light absorber is positioned between the ultraviolet light source and the adhesive;
wherein the light absorber is positioned such that light having a wavelength from greater than or equal to about 190 nm to less than or equal to about 500 nm is not incident to the adhesive.

9. The optical assembly of claim 8, wherein the optical element is a lens.

10. The optical assembly of claim 8, wherein the blocking coating further includes an anti-reflective layer positioned between the light absorber and the optical element.

11. The optical assembly of claim 10, wherein the anti-reflective layer comprises a material selected from the group consisting of metal oxides, metal nitrides, metal carbides, and mixtures thereof.

12. The optical assembly of claim 10, wherein the anti-reflective layer has a reflectance of less than or equal to about 20% for light with wavelengths of from greater than or equal to about 190 nm to less than or equal to about 500 nm.

13. The optical assembly of claim 8, wherein the light absorber comprises one or more materials selected from the group consisting of chromium, titanium, zinc, nickel, manganese, iron, niobium, silver, gold, hafnium, aluminum, tantalum, oxides thereof, nitrides thereof, and carbides thereof.

14. The optical assembly of claim 8, wherein the capping layer is in direct contact with the adhesive.

15. The optical assembly of claim 8, wherein the capping layer comprises a material selected from the group consisting of $SiO_2$, metal oxides, metal nitrides, and metal carbides.

16. The optical assembly of claim 8, wherein the capping layer has a transmittance, per mm thickness, at each wavelength in the range from 225 nm-380 nm of at least 85%.

17. The optical assembly of claim 8, wherein the capping layer has a transmittance, per mm thickness, at each wavelength in the range from 225 nm-380 nm of at least 95%.

18. The optical assembly of claim 8, wherein the optical element comprises $CaF_2$, the light absorber comprises Cr, and the capping layer comprises $SiO_2$.

19. The optical assembly of claim 8, further comprising an adhesion promoter positioned between the light absorber and the optical element.

20. The optical assembly of claim 19, wherein the optical element comprises a fluoride material and the adhesion promoter comprises a fluoride material.

21. The optical assembly of claim 19, wherein optical element comprises $CaF_2$ and the adhesion promoter comprises $MgF_2$.

22. The optical assembly of claim 8, wherein the capping layer is in direct contact with the blocking coating.

23. The optical assembly of claim 8, wherein the capping layer is in direct contact with the light absorber.

24. A method for reducing degradation of an adhesive in an optical assembly, the method comprising:
   applying a blocking coating to an optical element, the optical element including a circumferential portion surrounding a central portion, the blocking coating directly contacting the circumferential portion of the optical element, the central portion of the optical element being free of the blocking coating, the blocking coating including a light absorber that does not transmit light with wavelengths from greater than or equal to about 190 nm to less than or equal to about 500 nm;
   applying a capping layer to the blocking coating, the capping layer comprising $SiO_2$ or a metal oxide material;
   applying an adhesive to the capping layer, the adhesive having a curing wavelength, the blocking coating not transmitting the curing wavelength;
   configuring the light absorber and the adhesive so that light with wavelengths from greater than or equal to about 190 nm to less than or equal to about 500 nm is not incident to the adhesive; and
   after the adhesive has been cured, emitting ultraviolet light from an ultraviolet light source, wherein the light absorber is positioned between the ultraviolet light source and the adhesive.

25. The method of claim 24, wherein the adhesive is in direct contact with a holder and the adhesive is configured to adhere the optical element to the holder.

* * * * *

UNITED STATES PATENT AND TRADEMARK OFFICE
CERTIFICATE OF CORRECTION

PATENT NO.        : 10,459,134 B2                                     Page 1 of 1
APPLICATION NO.   : 15/229863
DATED             : October 29, 2019
INVENTOR(S)       : Michael Jerome Cangemi et al.

It is certified that error appears in the above-identified patent and that said Letters Patent is hereby corrected as shown below:

On the Title Page

In Column 2, item (57), Abstract, Line 8, delete "400 nm;" and insert -- 400 nm. --, therefor.

Signed and Sealed this
Third Day of March, 2020

Andrei Iancu
*Director of the United States Patent and Trademark Office*